US 11,780,462 B2

United States Patent
Vora et al.

(10) Patent No.: US 11,780,462 B2
(45) Date of Patent: *Oct. 10, 2023

(54) DRIVEWAY PULLOVERS FOR AUTONOMOUS VEHICLES

(71) Applicant: Waymo LLC, Mountain View, CA (US)

(72) Inventors: Mishika Vora, Hayward, CA (US); Jonathan Lee Pedersen, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,059

(22) Filed: Oct. 17, 2022

(65) Prior Publication Data
US 2023/0082219 A1 Mar. 16, 2023

Related U.S. Application Data

(63) Continuation of application No. 17/308,092, filed on May 5, 2021, now Pat. No. 11,498,585.

(51) Int. Cl.
| | |
|---|---|
| *G05D 1/00* | (2006.01) |
| *B60W 60/00* | (2020.01) |
| *B60W 50/14* | (2020.01) |
| *B60W 30/18* | (2012.01) |

(52) U.S. Cl.
CPC .... *B60W 60/001* (2020.02); *B60W 30/18009* (2013.01); *B60W 50/14* (2013.01); *B60W 2555/20* (2020.02)

(58) Field of Classification Search
CPC .. G05D 1/0088; G05D 1/0274; G05D 1/0272; G05D 1/0027; G05D 1/0293; G01C 21/3438; G01C 21/343; G01C 21/3492; G01C 21/3484; G01C 21/3676; G06Q 50/30; G06Q 30/0629; G06Q 30/0639; G06Q 30/0635; G06Q 30/0643; G06Q 10/0631

See application file for complete search history.

(56) References Cited

U.S. PATENT DOCUMENTS

| | | |
|---|---|---|
| 10,955,848 B2 | 3/2021 | Dyer et al. |
| 2019/0137290 A1 | 5/2019 | Levy et al. |
| 2019/0187702 A1 | 6/2019 | Herbach et al. |
| 2020/0172089 A1* | 6/2020 | Dyer .................. G05D 1/0221 |

(Continued)

*Primary Examiner* — John Kwon
(74) *Attorney, Agent, or Firm* — Botos Churchill IP Law

(57) ABSTRACT

Aspects of the disclosure provide for enabling autonomous vehicles to pull over into driveways when picking up or dropping off passengers or goods. For instance, a request for a trip identifying a first location and a second location may be received. The first location may be a location of a client computing device, and the second location may be a starting location or a destination for the trip. A user preference for the trip indicating that a pickup for the trip be in a driveway may be identified. That the first location corresponds with the second location may be identified. Based on the determination that the first location corresponds with the second location, dispatch instructions may be to an autonomous vehicle. The dispatch instructions may identify a polygon for a driveway at the second location in order to cause the autonomous vehicle to pull over into the driveway.

20 Claims, 13 Drawing Sheets

(56) References Cited

U.S. PATENT DOCUMENTS

| | | | |
|---|---|---|---|
| 2020/0174494 A1 | 6/2020 | Lessels | |
| 2020/0242924 A1 | 7/2020 | Publicover et al. | |
| 2020/0326194 A1* | 10/2020 | Wang | G01C 21/3492 |
| 2020/0386558 A1 | 12/2020 | Delizio | |
| 2021/0053567 A1* | 2/2021 | Dyer | G05D 1/0088 |
| 2022/0205794 A1 | 6/2022 | Friedman et al. | |
| 2022/0355817 A1* | 11/2022 | Vora | B60W 60/001 |
| 2022/0371618 A1* | 11/2022 | Vora | B60W 10/30 |

\* cited by examiner

DRIVEWAY PULLOVERS FOR AUTONOMOUS VEHICLES

CROSS REFERENCE TO RELATED APPLICATIONS

The present application is a continuation of U.S. patent application Ser. No. 17/308,092, filed May 5, 2021, the entire disclosure of which is incorporated herein by reference.

BACKGROUND

Autonomous vehicles, for instance, vehicles that may not require a human driver, can be used to aid in the transport of passengers or items from one location to another. Such vehicles may operate in a fully autonomous mode where passengers may provide some initial input, such as a pickup or destination location, and the vehicle maneuvers itself to that location. When approaching the location or at any point during a trip, an autonomous vehicle may continuously look for locations to stop the vehicle. These locations may be used, for example, for brief stops to pick up and/or drop off passengers and/or goods for example, for a transportation service. Typically, autonomous vehicles may look for such locations when the vehicle is within some distance of a destination.

BRIEF SUMMARY

Aspects of the disclosure provide a method of enabling autonomous vehicles to pull over into driveways when picking up or dropping off passengers or goods. The method includes receiving, by one or more processors, a request for a trip, the request identifying a first location and a second location, the first location being a location of a client computing device and the second location being a starting location or a destination for the trip; identifying, by the one or more processors, a user preference for the trip, the user preference indicating that a pickup for the trip be in a driveway; determining, by the one or more processors, that the first location corresponds with the second location; and based on the determination that the first location corresponds with the second location, sending, by the one or more processors, dispatch instructions to an autonomous vehicle, the dispatch instructions identifying a polygon for a driveway at the second location in order to cause the autonomous vehicle to pull over into the driveway.

In one example, the request for the trip further includes the user preference. In another example, the method also includes receiving the user preference and prior to receiving the request for the trip, storing the user preference in memory. In this example, identifying the user preference includes accessing the memory to retrieve the user preference. In another example, the method also includes, in response to receiving the request for the trip, identifying that pre-stored map information includes the polygon for the driveway. In this example, the method also includes, in response to identifying that pre-stored map information includes the polygon for the driveway and determining that the first location corresponds to the second location, sending a notification to the client computing device, the notification requesting a user to confirm whether the autonomous vehicle should use the driveway. In addition, the method also includes, receiving a response from the client computing device indicating that the autonomous vehicle should use the driveway. In this example, sending the dispatch instructions is in response to receiving the response. In addition or alternatively, the method also includes identifying a weather condition for the trip, and wherein sending the notification is in response to identifying the weather condition. In this example, the weather condition includes precipitation. In another example, determining that the first location corresponds with the second location includes determining whether the first location and the second location overlap given an accuracy of the first location. In another example, determining that the first location corresponds with the second location includes determining whether the first location is within a predetermined distance of the second location.

Another aspect of the disclosure provides a system for enabling autonomous vehicles to pull over into driveways when picking up or dropping off passengers or goods. The system includes one or more processors configured to: receive a request for a trip, the request identifying a first location and a second location, the first location being a location of a client computing device and the second location being a starting location or a destination for the trip; identify a user preference for the trip, the user preference indicating that a pickup for the trip be in a driveway; determine that the first location corresponds with the second location; and based on the determination that the first location corresponds with the second location, send dispatch instructions to an autonomous vehicle, the dispatch instructions identifying a polygon for a driveway at the second location in order to cause the autonomous vehicle to pull over into the driveway.

In one example, the request for the trip further includes the user preference. In another example, the one or more processors are further configured to: receive the user preference; prior to receiving the request for the trip, store the user preference in memory; and identify the user preference further by accessing the memory to retrieve the user preference. In another example, the one or more processors are further configured to, in response to receiving the request for the trip, identify that pre-stored map information includes the polygon for the driveway. In this example, the one or more processors are further configured to, in response to identifying that pre-stored map information includes the polygon for the driveway and determining that the first location corresponds to the second location, send a notification to the client computing device, the notification requesting a user to confirm whether the autonomous vehicle should use the driveway. In addition, the one or more processors are further configured to, receive a response from the client computing device indicating that the autonomous vehicle should use the driveway, and send the dispatch instructions further in response to receiving the response. In addition or alternatively, the one or more processors are further configured to identify a weather condition for the trip, and to send the notification further in response to identifying the weather condition. In this example, the weather condition includes precipitation. In another example, the one or more processors are further configured to determine that the first location corresponds with the second location by determining whether the first location and the second location overlap given an accuracy of the first location. In another example, the one or more processors are further configured to determine that the first location corresponds with the second location by determining whether the first location is within a predetermined distance of the second location.

DETAILED DESCRIPTION

Overview

Figure 1:
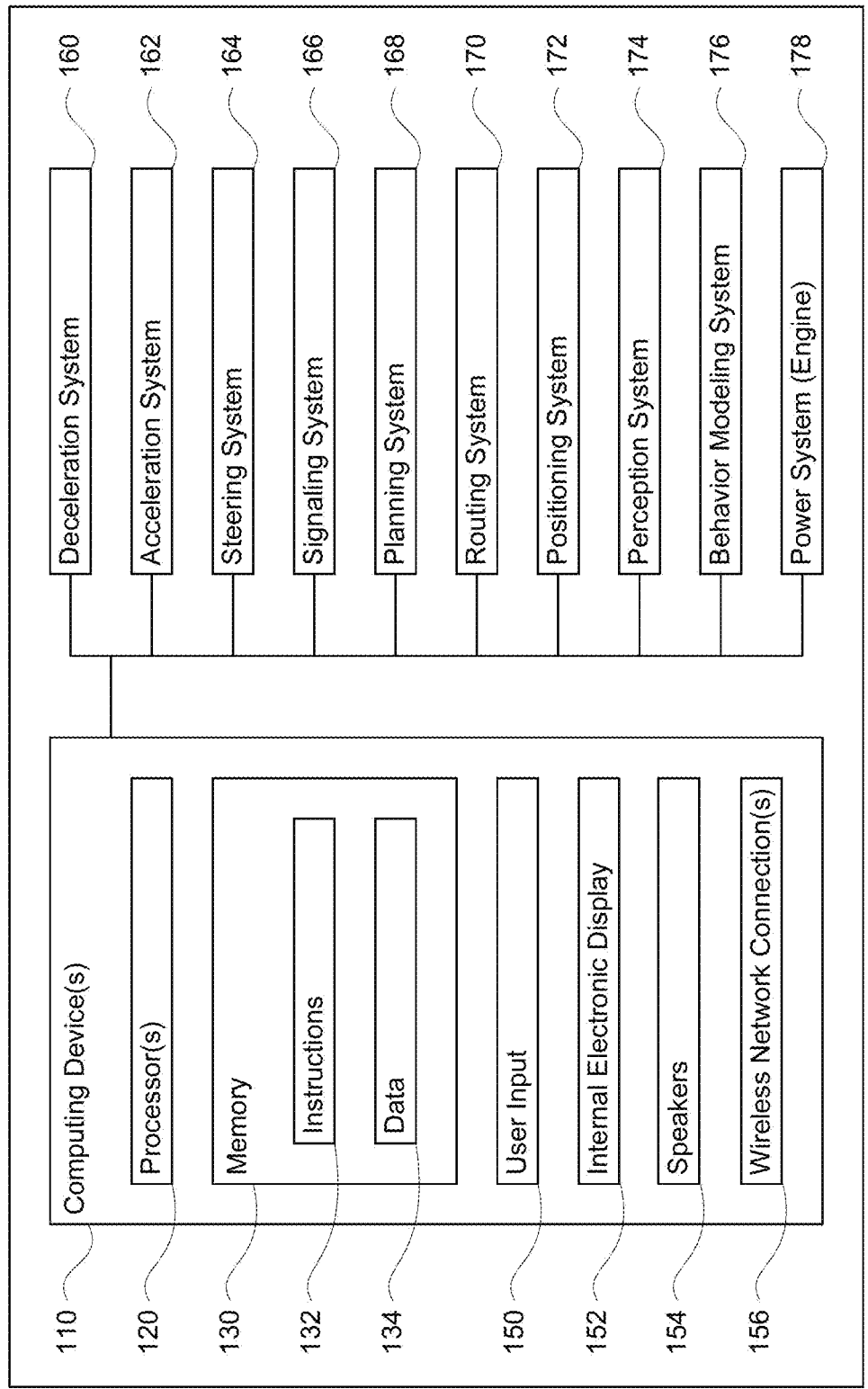
FIG. 1 is a functional diagram of an example vehicle in accordance with an exemplary embodiment.

The technology relates to enabling autonomous vehicles to pull over into driveways when picking up or dropping off passengers or goods. These driveways may be residential or commercial depending upon the circumstances. Typically, autonomous vehicles may stop adjacent to a curb or in a designated (e.g. marked) parking space. As such, driveways are generally not used by autonomous vehicles for pickups or drop offs of passengers. However, the features described herein may provide for a transportation service which utilizes autonomous vehicles may allow its vehicles to pull over into driveways in limited circumstances, such as when a passenger has authorized or requested that they be picked up or dropped off in a driveway.

In order to enable pulling over in driveways, the driveways themselves may be at least partially mapped. For instance, map information used by the transportation service and autonomous vehicles may identify driveways. For example, a driveway may be identified by a geolocated polygon marking out the boundaries of the driveway.

In order to enable autonomous vehicles to pull over into driveways, a request for a trip may be received by one or more server computing devices of the transportation service. For instance, a user may request a trip using a client computing device (e.g. a phone or other computing device). The request may identify a plurality of locations. For instance, a first location may be a current location of a client computing device (e.g. a GPS location) used to send the request for the trip. A second location may be a starting location or pickup location (e.g. for the user or goods) for the trip.

The user may select an option for an autonomous vehicle to pullover into a driveway when picking up or dropping off on trips. This option may send a signal to the server computing devices indicating the user's preference for pickup and dropping off within or inside of driveways. The server computing devices may store the user preference with the user's account in memory for later access.

The server computing devices may identify a user preference for a trip. As noted above, this user preference may indicate that the user prefers that a pickup or drop off for a trip be in a driveway. The user preference may be accessed from the memory, or may be received as part of the request for a trip.

The server computing devices may then determine whether the first location corresponds with the second location. For instance, the server computing devices may confirm that the user is at or near the location of the pickup before allowing an autonomous vehicle to pullover in a driveway at that location. In other words, before authorizing an autonomous vehicle to use a driveway to pick up a passenger or goods, the server computing devices may confirm that the user is at or near that location. This may act as a safeguard to prevent pulling into driveways that are not whether the user desired or intended to be picked up and to avoid inconvenience to other road users, residences, businesses, etc.

Based on this determination, the server computing devices may send dispatch instructions to an autonomous vehicle in order to cause the autonomous vehicle to pull over into a driveway at the second location. The dispatch instructions may identify a polygon for the driveway at, the second location in order to cause the autonomous vehicle to pull over into the driveway. In addition, the dispatch instructions may also identify other information such as authentication information or credentials for authenticating the client computing device as well as a destination for the trip.

The features described herein may allow for enabling autonomous vehicles to pull over into driveways when picking up or dropping off passengers or goods. The use of driveways may be especially helpful in both suburban and dense urban environments where parking may not always be readily available near a pickup or drop off location. Moreover, the use of driveways may reduce the likelihood of inconvenience to other road users as the autonomous vehicle does not need to take up another parking spot or potentially block traffic if double-parked. In many cases, this may reduce the distance the passenger (or other user of the transportation service) needs to travel to reach the vehicle or destination (e.g. a house or building) and also may provide the passenger (or other user of the transportation service) with more time to load or unload objects from the vehicle. In addition, allowing pullovers in driveways may improve the passenger's pickup or drop off experience by making it feel more personalized, but the same may be true for deliveries of goods.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more button, mouse, keyboard, touch screen and/or microphone), various electronic displays (e.g., a monitor having a screen or any other electrical device that is operable to display information), and speakers 154 to provide information to a passenger of the vehicle 100 or others as needed. For example, electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may be part of an autonomous control system for the vehicle 100 and may be capable of communicating with various components of the vehicle in order to control the vehicle in an autonomous driving mode. For example, returning, to FIG. 1, the computing devices 110 may be in communication with various systems of vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of vehicle 100 in accordance with the instructions 134 of memory 130 in the autonomous driving mode.

As an example, the computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. The computing devices 110 may also use the signaling system 166 in order to signal the vehicle's intent to other drivers or vehicles, for example, by lighting turn signals or brake lights when needed.

Routing system 170 may be used by the computing devices 110 in order to generate a route to a destination using map information. Planning system 168 may be used by computing device 110 in order to generate short-term trajectories that allow the vehicle to follow routes generated by the routing system. In this regard, the planning system 168 and/or routing system 166 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device, as such as the computing devices 410 discussed below or other computing devices), pullover spots, vegetation, or other such objects and information.

Figure 2:
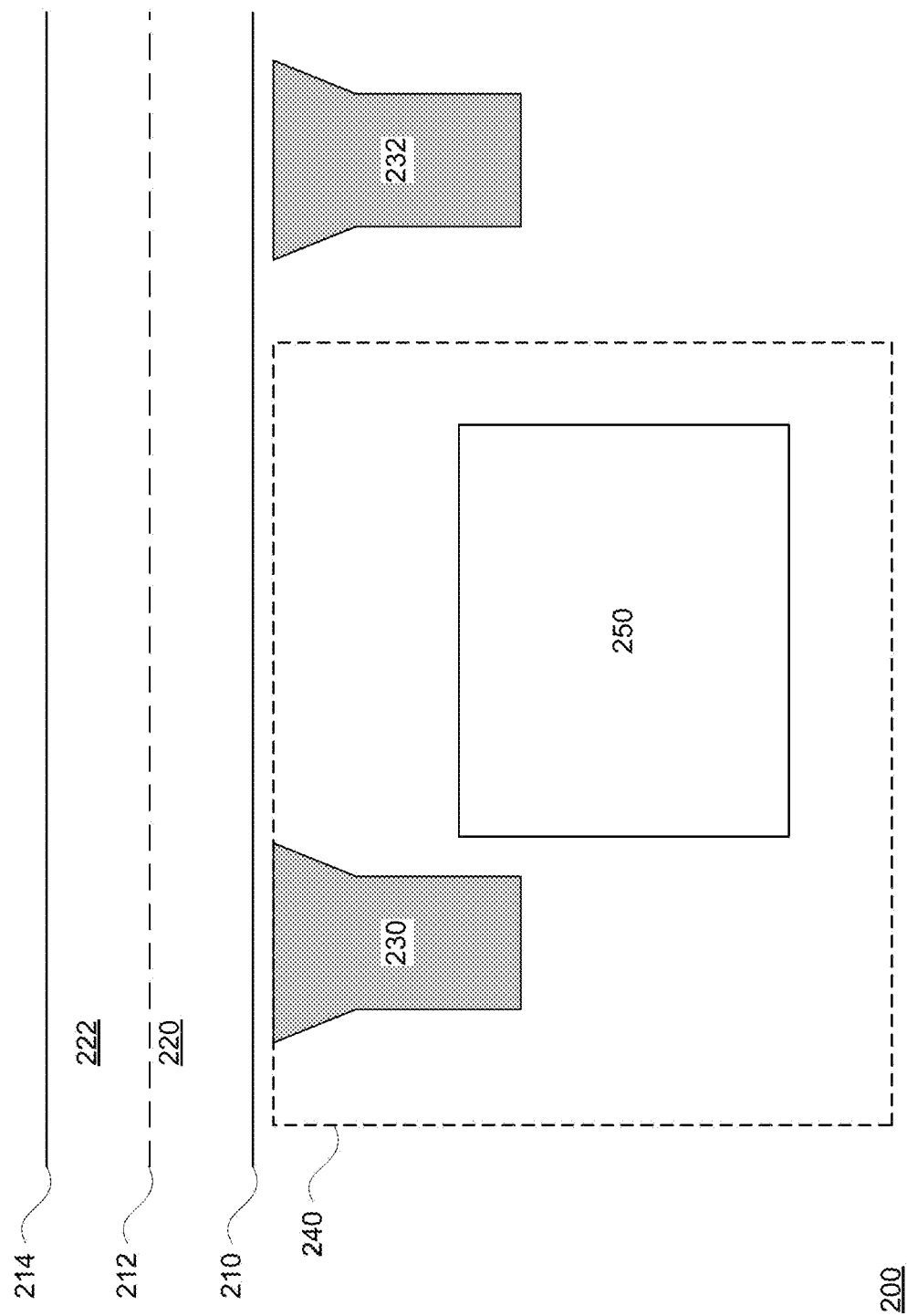
FIG. 2 is an example of map information in accordance with aspects of the disclosure.

FIG. 2 is an example of map information 200 for a small section of roadway. The map information 200 that includes information identifying the shape, location, and other characteristics of lane markers or lane lines 210, 212, 214, which define lanes 220, 222. In addition to the aforementioned features and information, the map information may also include information that identifies the direction of traffic for each lane as well as information that allows the computing devices 110 to determine whether the vehicle has the right of way to complete a particular maneuver (i.e. complete a turn or cross a lane of traffic or intersection).

In order to enable pulling over in driveways, the driveways themselves may be at least partially mapped. For instance, map information used by the transportation service and autonomous vehicles may identify driveways. For example a driveway may be identified by a geolocated polygon marking out the boundaries of the driveway such as polygons 230, 232. Each vertex of the polygons 230, 232 may be associated with a two or three-dimensional location (e.g. latitude, longitude, altitude).

Each driveway polygon may be associated with an address. The address may be determined using lot boundaries. These lot boundaries may be obtained from county records, aerial images, lot boundary maps, etc. in the example of FIG. 2, the polygon 230 may be associated with lot boundary 240 (shown in dashed line) which also includes a polygon 250 representing a building. In this regard, the map information may indicate that the polygon 230 "belongs" to the address of the building represented by the polygon 250 and/or the lot boundary 240. At the same time, the polygon 232 may be associated with another lot boundary. Thus the driveway of polygon 232 may belong to another address.

Driveway boundaries may be identified, for example, by human labelers or by using such labeled data to train machine learning models to identify polygons for driveways using input map information. In some instances, the polygon may not actually correspond to an entire driveway, but rather may actually identify only a portion of the driveway adjacent to a road. This may be due to the length of the driveway and the quality of the information available to map the driveway (e.g. longer driveways are less likely to be fully mapped than shorter driveways).

In addition to the aforementioned physical feature information, the map information may be configured as a roadgraph which includes a plurality of graph nodes and edges representing road or lane segments that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 166 may use the aforementioned map information to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 172 may also include other devices in communication with the computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other vehicles, obstacles in the roadway, traffic signals, signs, trees, etc. For example, the perception system 174 may include LIDARs, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location.

Figure 3:
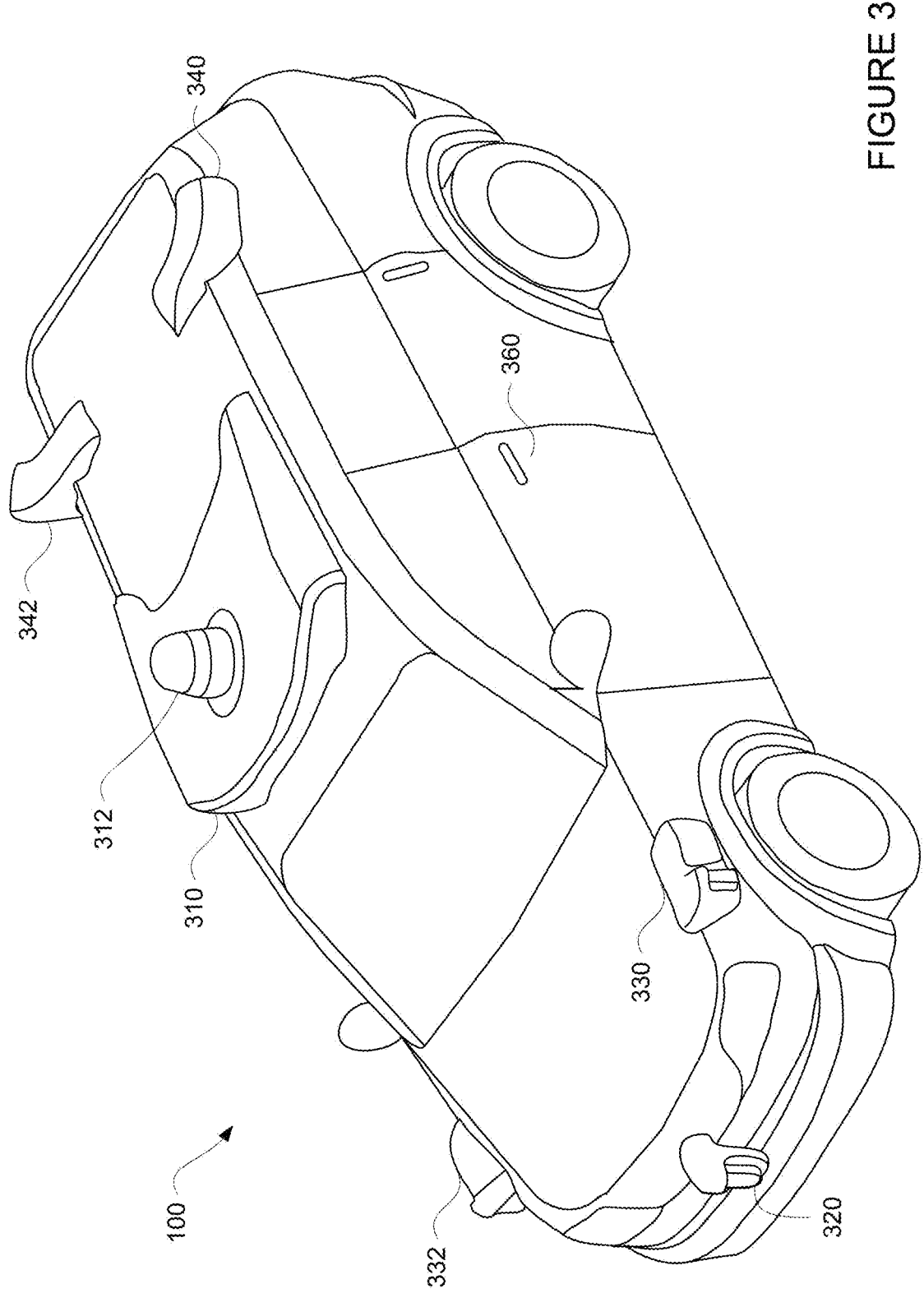
FIG. 3 is an example external view of a vehicle in accordance with aspects of the disclosure.

For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of vehicle 100 in accordance with the instructions 134 of memory 130.

The various systems of the vehicle may function using autonomous vehicle control software in order to determine how to and to control the vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module of the behavior modeling system 176 which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate trajectories for the vehicle to follow for some brief period of time into the future based on a route generated by a routing module of the routing system 170. In this regard, the trajectories may define the specific characteristics of acceleration, deceleration, speed, etc. to allow the vehicle to follow the route towards reaching a destination. A control system software module of the computing devices 110 may be configured to control movement of the vehicle, for instance by controlling braking, acceleration and steering of the vehicle, in order to follow a trajectory.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
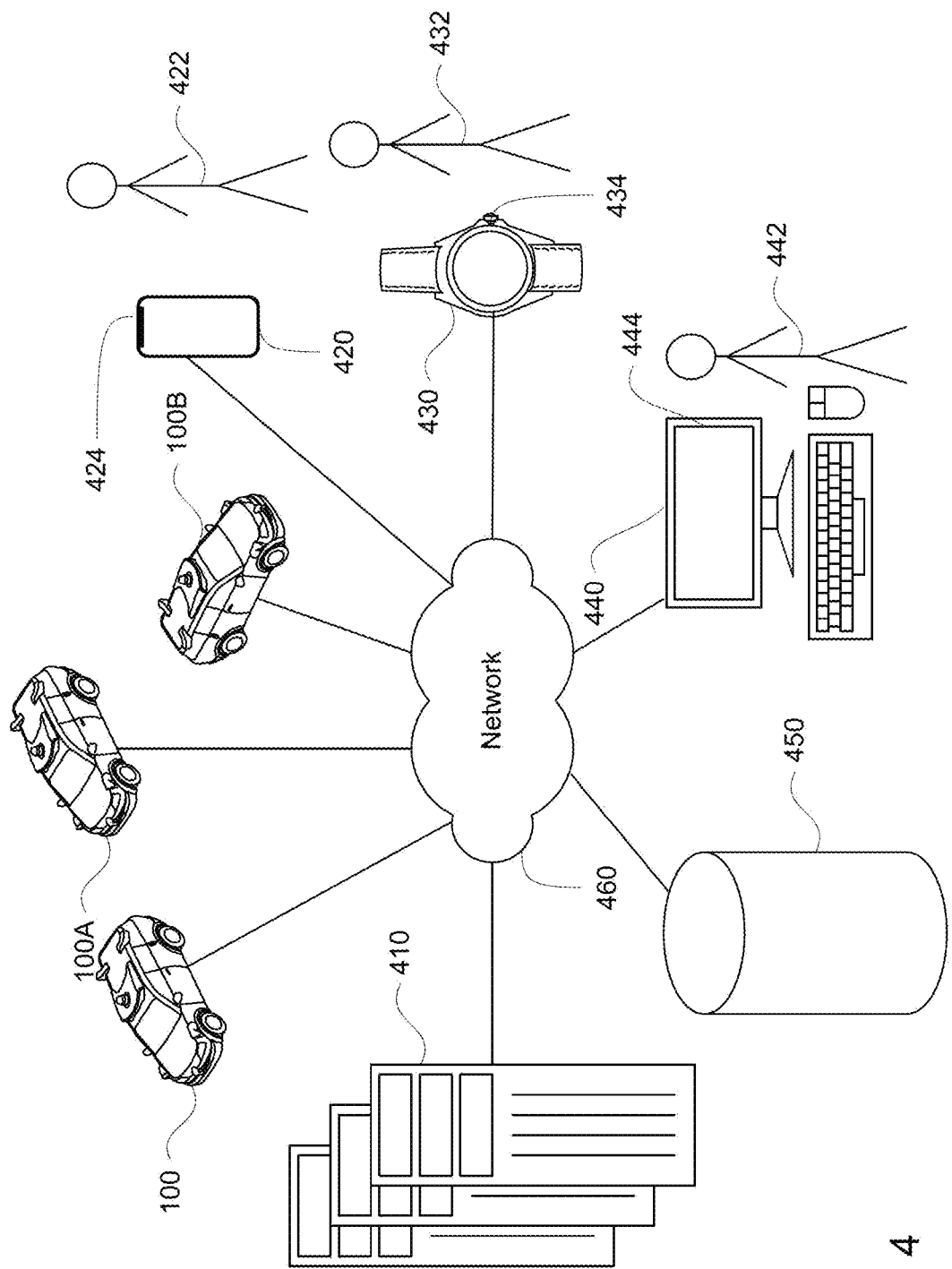
FIG. 4 is a pictorial diagram of an example system in accordance with aspects of the disclosure.
Figure 5:
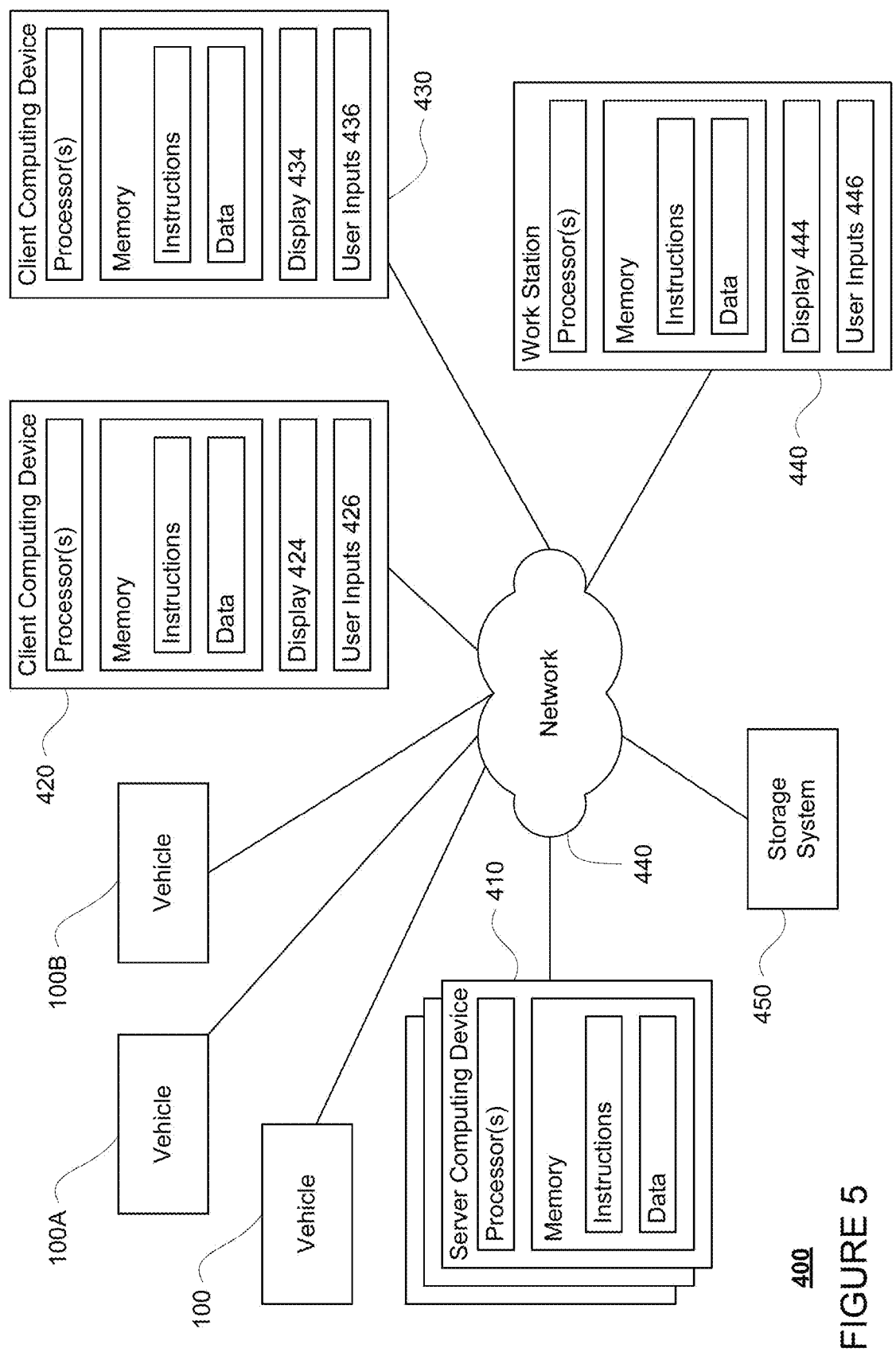
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100A and vehicle 100B, which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A or vehicle 100B as well as computing devices 420, 430, 440 via the network 460. For example, vehicles 100, 100A, 100B, may be a part of a fleet of vehicles that can be dispatched by server computing devices to various locations. In this regard, the server computing devices 410 may function as a fleet management system which can be used to dispatch vehicles such as vehicles 100, 100A, 100B to different locations in order to pick up and drop off passengers. In addition, the computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 3, each client computing device 420, 430 may be a personal computing device intended for use by a user 422, 432 and have all of the components normally used in connection with a personal computing device including a one or more processors a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446

(e.g., a mouse, keyboard, touchscreen or microphone). The client computing devices may also include a camera for recording video streams, speakers, a network interface device, and all of the components used for connecting these elements to one another.

Although the client computing devices 420, 430 may each comprise a full-sized personal computing device, they may alternatively comprise mobile computing devices capable of wirelessly exchanging data with a server over a network such as the Internet, By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 3. As an example the user may input information using a small keyboard, a keypad, microphone, using visual signals with a camera, or a touch screen. As yet another example, client computing device 440 may be a desktop computing system including a keyboard, mouse, camera and other input devices.

Each of the client computing devices may be remote computing device used by a person (e.g. human operators or users 422, 432, 442) to review and analyze sensor data and other information generated by a perception system of a vehicle such as perception system 174 of vehicle 100. For example, user 442 may use the client computing device 440 to review visualizations generated as discussed herein. Although only a few remote computing devices are shown in FIGS. 4 and 5, any number of such work stations may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 3 and 4, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. For example, the storage system 450 may also store a version of the aforementioned detailed map information (e.g. the map information 200) including all or some of the features discussed above.

As another example, the information may include user account information such as credentials (e.g., a username and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more preferences for the user. Storage system 450 may store various types of information as described in more detail below. This information may be retrieved or otherwise accessed by a server computing device, such as one or more server computing devices 410, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. In addition to information that can be used for identification and authentication purposes, the account information may include other information, such as a history of usage of the service. This "trip history" may include the dates, times, pick up locations, drop off locations, and destinations of previous trips using the service. In some examples, the user account information for a user may include "favorite" spots or previously identified user-preferred locations that the user has saved to his or her account identifying preferred pickup or drop off locations for that user. The user account information may also include personal information such as the user's name, contact information, identifying information of the user's client computing device (or devices if multiple devices are used with the same user account), as well as one or more preferences for the user.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 11:
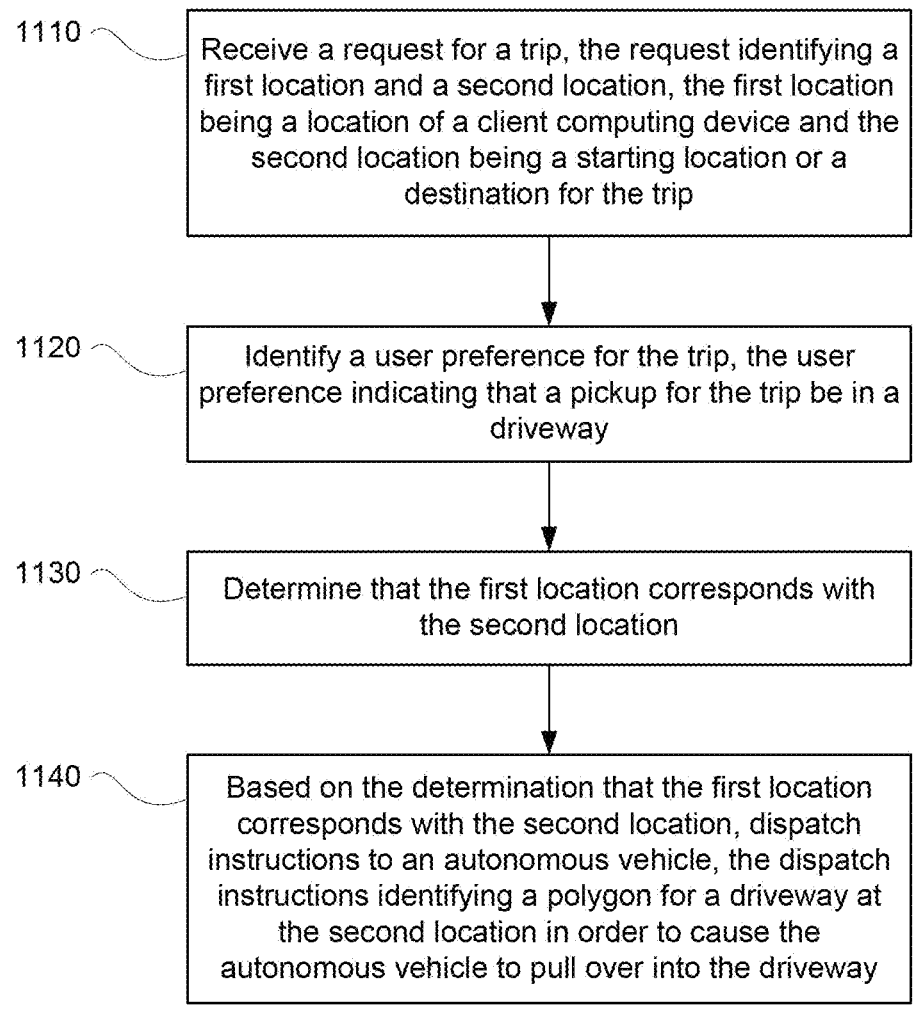
FIG. 11 is an example flow diagram in accordance with aspects of the disclosure.

FIG. 11 is an example flow diagram 1100 for enabling autonomous vehicles to pull over into driveways when picking up or dropping off passengers or goods, which may be performed by one or more processors of one or more computing devices, such as the processors of the server computing devices 410 or the processors of any of the client computing devices 420, 430, 440. At block 1110, a request for a trip is received. The request identifies a first location and a second location, the first location being a location of a client computing device and the second location being a starting location or a destination for the trip.

In order to enable autonomous vehicles to pull over into driveways, a request for a trip may be received by one or more server computing devices of the transportation service. For instance, a user may request a trip using a client computing device (e.g. a phone or other computing device). The request may identify a plurality of locations. For instance, a first location may be a current location of a client computing device (e.g. a GPS location) used to send the request for the trip. A second location may be a starting location or pickup location (e.g. for the user or goods) for the trip.

The user may select an option for an autonomous vehicle to pullover into a driveway when picking up or dropping off on trips. For instance, the user may select an option when initially setting up or otherwise accessing an application of the transportation service. For instance, the user may select an option indicating that the user prefers or does not prefer to be picked up in driveways when available.

Figure 6:
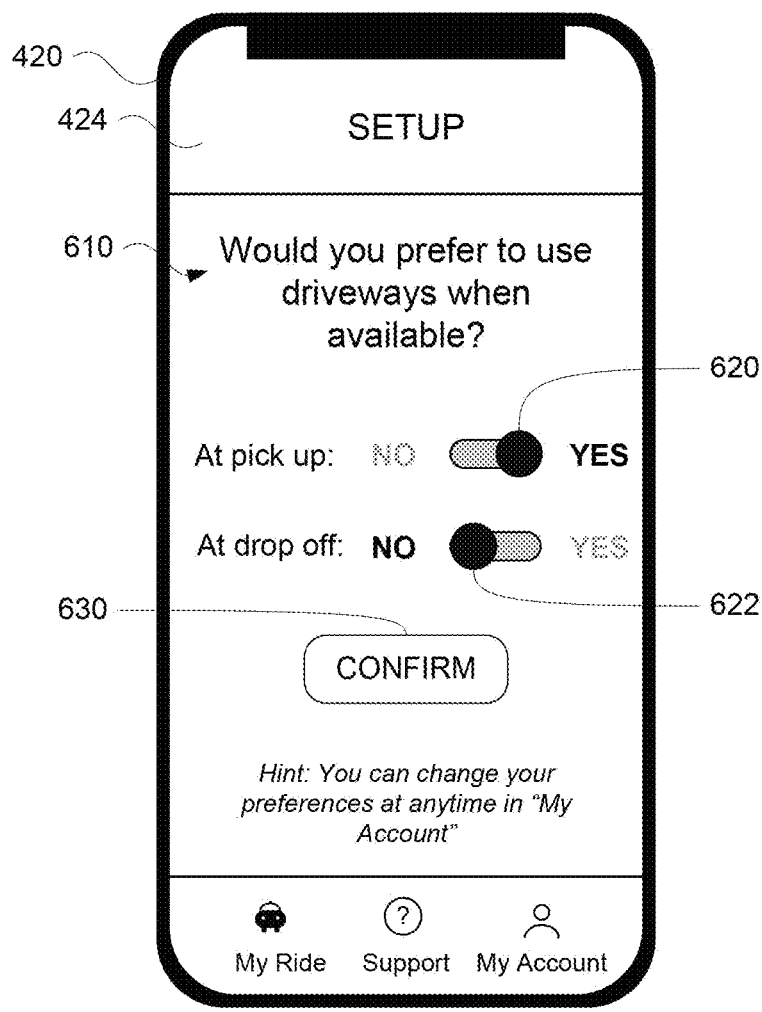
FIG. 6 is an example client computing device and screen shot in accordance with aspects of the disclosure.

For example, FIG. 6 is an example of a "screen shot" and client computing device 420. In this example, during the initial setup of the application, a user is provided with a notification 610 which allows the user to identify a preference for the service using driveways at pick up or drop off. Here, the user has selected for the service to use driveways at pick up when available, but not to use driveways at drop off by utilizing toggle switches 620, 622, The user may then confirm the preferences using an option such as the displayed "confirm" button 630.

In other instances, the user may select from one or more specific addresses as favorites or otherwise saved locations, such as "home", "work", etc. In some instances, when these locations include mapped driveways (e.g. driveways identified by polygons in the map information), the user may be provided with an option to indicate whether the user prefers or does not prefer to be picked up in driveways when available. This option may send a signal to the server computing devices indicating the user's preference for pickup and dropping off within or inside of driveways. The server computing devices may store the user preference with the user's account in memory for later access.

Figure 7:
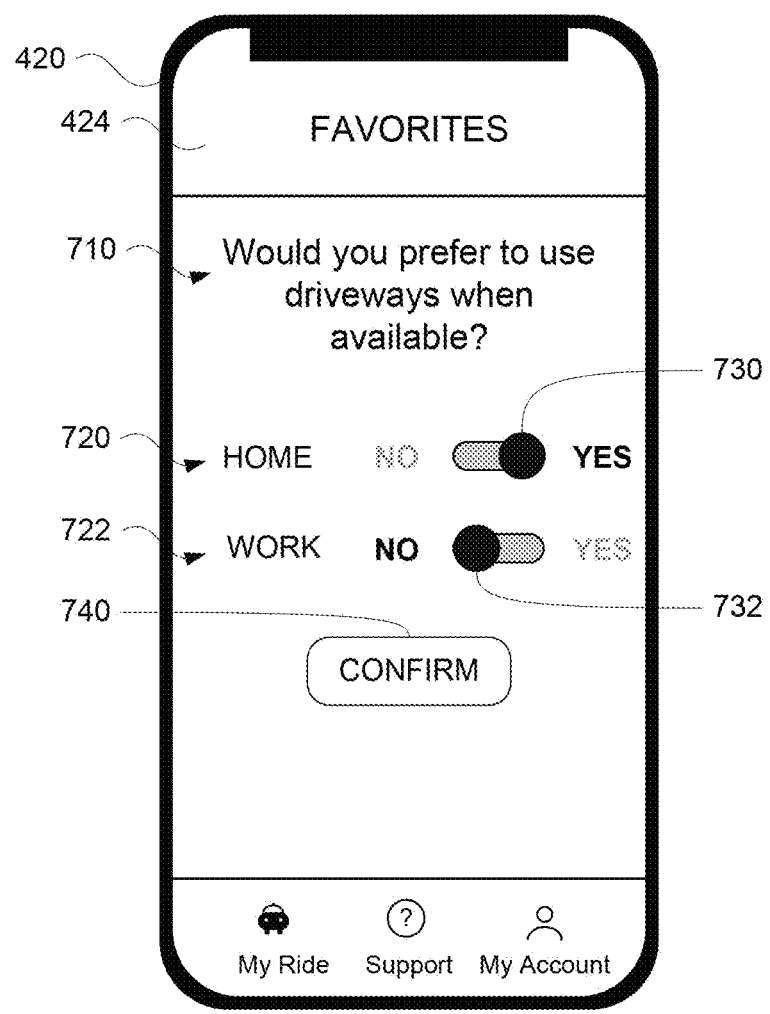
FIG. 7 is an example client computing device and screen shot in accordance with aspects of the disclosure.

For example, FIG. 7 is an example of a "screen shot" and client computing device 420. In this example, a user is provided with a notification 710 which allows the user to identify a preference for the service using driveways at pick up or drop off. The display 424 also includes a list of favorite locations 720, 722, here with short names "home" and "work" corresponding to whatever locations (e.g. addresses or specific map location) the user may have selected or otherwise identified previously. In this example, each favorite location includes a corresponding toggle switch 730, 732 which allows the user to identify a preference for the service using driveways at pick up and/or drop off. In this example, the user has selected for the service to use driveways when available at "home", but not to use driveways at "work". The user may then confirm the preferences using an option such as the displayed "confirm" button 740.

In addition or alternatively, the user may select a similar option when setting up a new trip. For instance, when inputting a pickup or drop off location, the application may display a map of nearby locations identifying which of those locations include mapped driveways (e.g. driveways identified by polygons in the map information). The user may then move the pickup or drop off location (e.g. move the map pin) to the location of a mapped driveway and confirm that location for a trip. As such, the user may be indicating a preference for an autonomous vehicle to use a driveway when picking up or dropping off the user or goods. In such instances, the user preference may be sent with the trip request to the server computing devices. This may be especially useful in situations where a user may require more time to load or unload objects from the vehicle, and thus may not always be needed by a particular user.

Figure 8A:
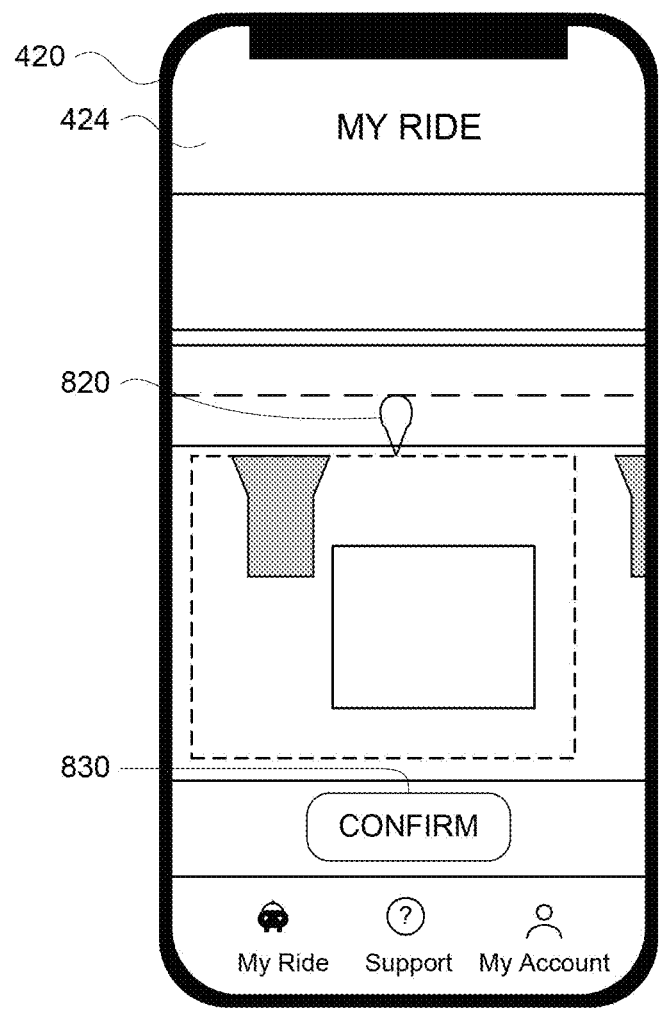
FIG. 8A is an example client computing device and screen shot in accordance with aspects of the disclosure.

For example, FIG. 8A is an example of a "screen shot" and client computing device 420. In this example, while setting, up a new ride (e.g. a new trip), a user is provided with a notification 810 indicating that the application would like the user to confirm the pickup location. In this example, the display 424 includes a portion of the map information including the polygon 230 corresponding to a driveway for the building represented by the polygon 250. The pickup location for the new trip, represented by map pin 820 may be at some default location corresponding to the address of the building represented by the polygon 250.

Figure 8B:
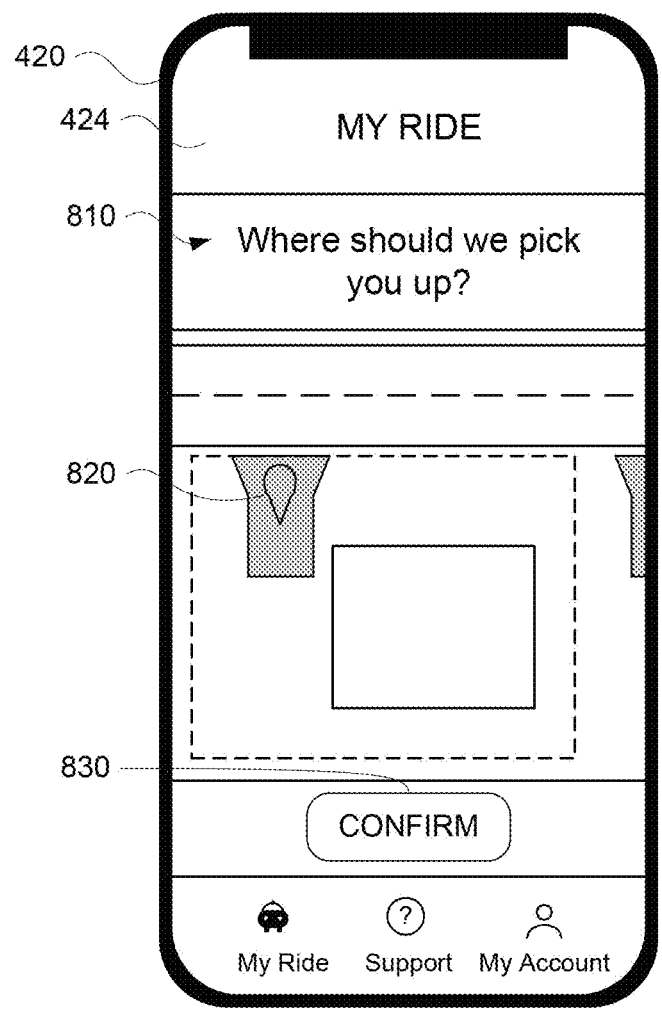
FIG. 8B is an example client computing device and screen shot in accordance with aspects of the disclosure.

FIG. 8B is another example of another "screen shot" and client computing device 420. In this example, the user has moved the location of the map pin 820 to within the polygon 230, for instance by tapping and dragging or other methods. By doing so, the user may indicate a preference that the autonomous vehicle that picks up the user utilizes a driveway. The user may then confirm the preference using an option such as the displayed "confirm" button 830. As noted above, this user preference may be sent with the trip request to the server computing devices 410. While the examples of FIGS. 8A and 8B represent a pickup location, a similar approach may also be used to indicate a user preference for an autonomous vehicle to use a driveway for drop offs.

Figure 9A:
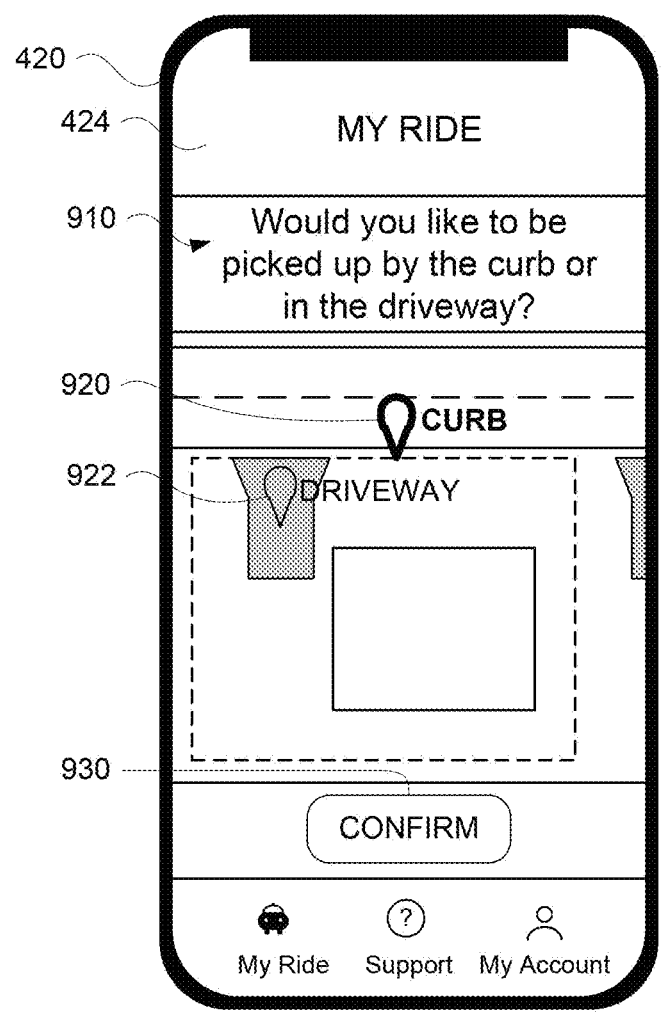
FIG. 9A is an example client computing device and screen shot in accordance with aspects of the disclosure.
Figure 9B:
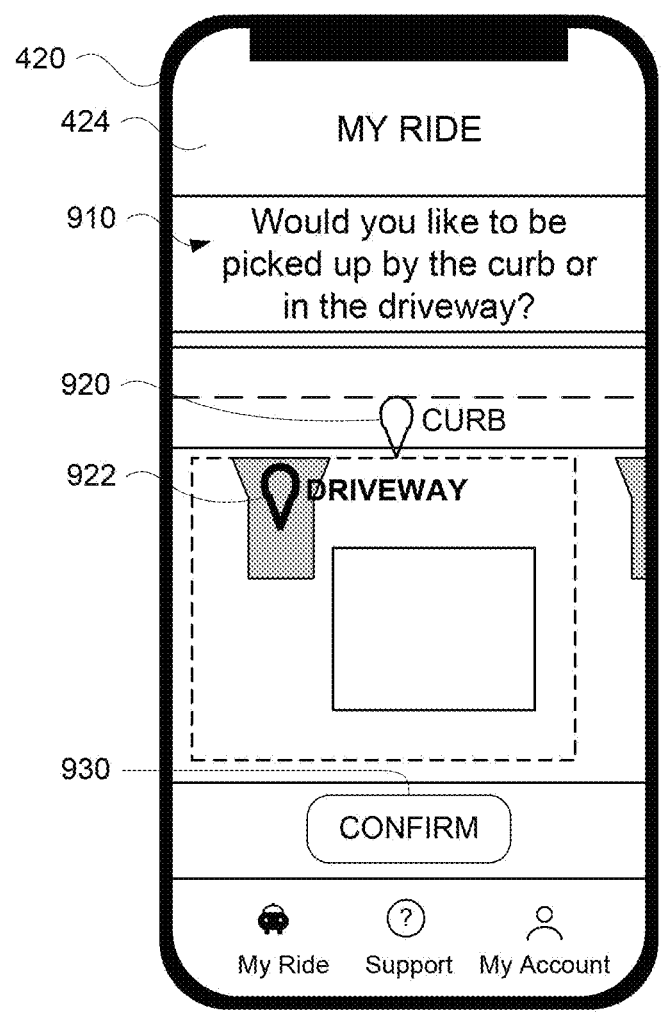
FIG. 9B is an example client computing device and screen shot in accordance with aspects of the disclosure.

In addition or alternatively, the server computing devices may send information to the client computing devices including one or more notifications. These notifications may be sent in response to the user identifying a pickup or drop off location for a trip. For instance, a notification may prompt the user to confirm whether the user would like a trip to use one or more driveways. For example, when viewing the map of locations identifying which of those locations include mapped driveways, the application may display a notification indicating that a driveway is available (e.g. mapped) for a pickup or drop off location identified by the user. For example, FIGS. 9A and 9B are examples of "screen shots" and client computing device 420. In this example, the user is provided with a notification 910 asking the user to confirm whether the user has a preference for being picked up at a curb or in a driveway. The user may respond to the notification, for instance by selecting the map pin 920 as depicted in FIG. 9A to indicate a preference for a curb or by selecting the map pin 922 as depicted in FIG. 9B to indicate a preference for a driveway, and the user preference may be sent to the server computing devices. The user may then confirm the preference using an option such as the displayed "confirm" button 930. As noted above, this user preference may be sent with the trip request to the server computing devices 410. While the examples of FIGS. 9A and 9B represent a pickup location, a similar approach may also be used to indicate a user preference for an autonomous vehicle to use a driveway for drop offs. Of course, the server computing devices may also confirm that an available/assigned vehicle would actually fit within the polygon of the driveway before sending such a notification.

Returning to FIG. 11, at block 1120 a user preference for the trip is identified. The user preference indicates a pickup for the trip be in a driveway. The server computing devices may identify a user preference for a trip. As noted above, this user preference may indicate that the user prefers that a pickup or drop off for a trip be in a driveway. The user preference may be accessed from the memory, or may be received as part of the request fora trip. Alternatively, the user preference may be identified in response to sending a notification indicating that a driveway is available for a pickup or drop off location identified by the user.

At block 1130, that the first location corresponds with the second location is determined. The server computing devices may then determine whether the first location corresponds with the second location. For instance, the server computing devices 410 may confirm that the user is at or near the location of the pickup before allowing an autonomous vehicle to pullover in a driveway at that location. To do so, the server computing devices 410 may compare the location of the client computing device (e.g. GPS location) with the pickup location to see if these locations overlap and/or are within a predetermined distance of one another. This may involve looking at the accuracy of the location of the client computing device (e.g. accuracy of the of GPS location) and determine whether it is close enough, or rather within a predetermined distance of the driveway. As an example, this predetermined distance may be 10 meters or more or less. In addition, the server computing devices may send the user's client computing device a notification that the transportation service will only allow pickup pullovers in the driveway if the user is nearby.

Figure 10:
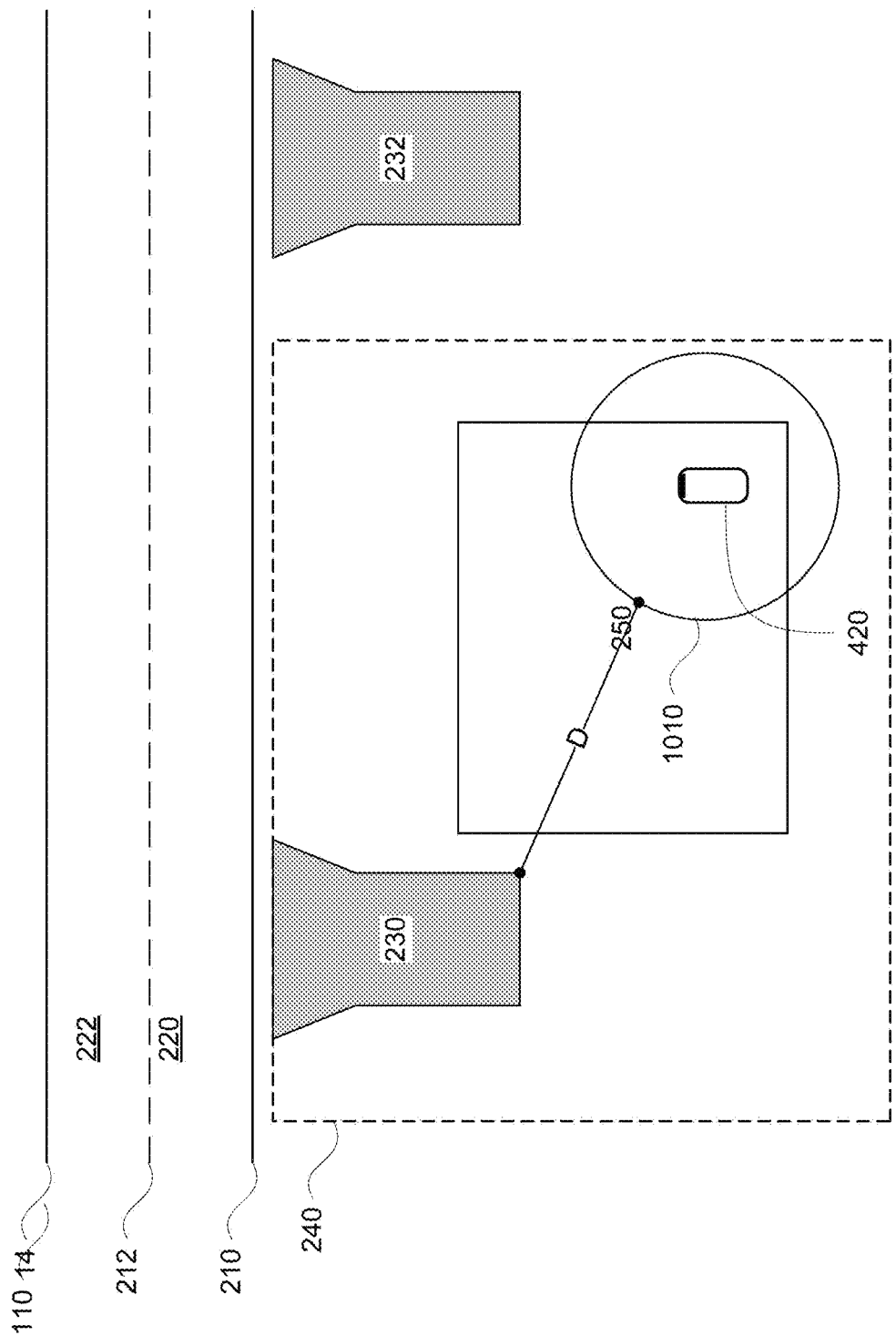
FIG. 10 is an example of map information, location of a client computing device in accordance with aspects of the disclosure.

FIG. 10 is an example of the map information 200 which also depicts the location of client computing device 420. As noted above, this information may be received by the server computing devices 410 from the client computing device 420. The circle 1010 represents an accuracy of the location of the client computing device 420. The distance D between the circle 1010 and the polygon 230 represents an estimate of how close the user's client computing device and/or the user is to the driveway. In this example, the user may have requested that a pickup be performed within the polygon 230 of the driveway.

If the distance D is greater than the predetermined distance, the server computing devices may determine that the pickup location (here anywhere within the polygon 230) does not correspond to the location of the user's client computing device. As such, the server computing devices 410 may determine that the driveway should not be used by an autonomous vehicle for the pickup.

Similarly, if the distance D is less than the predetermined distance, the server computing devices may determine that the pickup location (here anywhere within the polygon 230) does correspond to the location of the user's client computing device. As such, the server computing devices 410 may determine that the driveway may be used by an autonomous vehicle for the pickup if it is available.

In other words, before authorizing an autonomous vehicle to use a driveway to pick up a passenger or goods, the server computing devices may confirm that the user is at or near that location. This may act as a safeguard to prevent pulling into driveways that are not whether the user desired or intended to be picked up and to avoid inconvenience to other road users, residences, businesses, etc.

Returning to FIG. 11, at block 1140, based on the determination that the first location corresponds with the second location, dispatch instructions are sent to an autonomous vehicle. The dispatch instructions identify a polygon for a driveway at the second location in order to cause the autonomous vehicle to pull over into the driveway (e.g. identify the polygon of the driveway by the location of its vertices and/or another identifier). Based on the determination that the first location corresponds with the second location, the server computing devices may send dispatch instructions to an autonomous vehicle in order to cause the autonomous vehicle to pull over into a driveway at the second location. The dispatch instructions may identify a polygon for the driveway at the second location in order to cause the autonomous vehicle to pull over into the driveway. In addition, the dispatch instructions may also identify other information such as authentication information or credentials for authenticating the client computing device as well as a destination for the trip.

The autonomous vehicle may then set the polygon of the driveway as a destination for the vehicle and control itself to that location. In some instances, the vehicle may approach the destination and determine that the driveway is not available (e.g. occupied or otherwise not accessible by the vehicle due to a gate or other obstacle). In such instances, the autonomous vehicle may look for a new nearby pullover location or simply pullover in front of the driveway (e.g. block the driveway). In some instances, the server computing devices may also provide notifications about this via the application and/or in the vehicle during the trip so that the user understands that the vehicle will try to pull into the driveway but will find a nearby location if not available because the exact pullover location likely cannot be guaranteed. In some instances, as the autonomous vehicle approaches the destination, additional precautions may be taken to ensure that it is safe for the vehicle to pull into the driveway.

In one example, the autonomous vehicle may confirm that the user is located at the second location before pulling into the driveway. For example, at some point during the trip, the autonomous vehicle may receive current location information (e.g. GPS location) from the user's client computing device, such as when the autonomous vehicle is a predetermined distance in time or space from the driveway. At this point, the autonomous vehicle may compare the received current location information to the in order to determine whether the user is likely to be at or near the driveway as in the example above.

In this regard, referring to the example of FIG. 1.0, if the distance D is greater than the predetermined distance, the vehicle's computing devices, for example computing devices 110, may determine that the pickup location (here anywhere within the polygon 230) does not correspond to the location of the user's client computing device. As such, the computing devices 110 may determine that the driveway should not be used by the vehicle 100 for the pickup. However, if the distance D is less than the predetermined distance, the computing devices 110 may determine that the pickup location (here anywhere within the polygon 230) does correspond to the location of the user's client computing device. As such, the computing devices 110 may determine that the driveway may be used by the vehicle 100 for the pickup if it is available.

In some instances, the vehicle may only pull into the driveway if the vehicle's computing devices have been able to authenticate the user's client computing device, which would indicate that the user is nearby. For instance, in addition to the pickup location and information identifying the client computing device, the one or more server computing devices may also provide the vehicle's computing device with authentication information. This authentication information may allow the vehicle's computing device to authenticate the user's client computing device when the vehicle is within a certain distance of the client computing device. This certain distance may depend upon the strength of a wireless signal from the client computing device.

The authentication information may include pairing information for authenticating the client computing device using near field communication, Wi-Fi, Bluetooth, local area network, or other short range communication methods. In this regard, once the vehicle has authenticated the client computing device, this may be considered a signal which confirms that the user of the client computing device is nearby, and thus, the vehicle's computing devices may determine that the vehicle is "permitted" to pull into the driveway and may control the vehicle in order to do so. Various authentication methods may be used which allow the vehicle and the client computing device to connect and communicate with one another.

In addition or alternatively, the user, via the user's client computing device, may receive a notification as the autonomous vehicle approaches a destination location. The notification may prompt the user to confirm whether the user would like a trip to use one or more driveways. As in the examples above, the user may respond to the notification (e.g. yes or no), and the user preference may be sent to the server computing devices. The server computing devices may then send the dispatch instructions and/or send an updated destination (e.g. identify the polygon of the driveway by the location of its vertices and/or another identifier) to the vehicle.

In some instances, the notifications described above may be sent in response to the server computing devices based on current weather conditions or other context such as traffic conditions. For example, if it is precipitating (e.g. snowing or raining), a user may prefer that the autonomous vehicle use a driveway for a pickup or drop off. Again, the user may respond to the notification (e.g. yes or no), and the user preference may be sent to the server computing devices. The server computing devices may then send the dispatch instructions and/or send an updated destination (e.g. identify the driveway polygon) to the vehicle.

The same or similar approaches may be used for the pickup or drop off of goods. For instance, in some instances, the transportation service may require that the same user/client computing device used to set up a trip is nearby when the goods are being picked up or dropped off. As in the examples above, confirming that the location of the user's client computing device corresponds to either a location for picking up or dropping off goods may act as a safeguard as the transportation service may want to avoid vehicles pulling into driveways for picking up or dropping off goods.

The features described herein may allow for enabling autonomous vehicles to pull over into driveways when picking up or dropping off passengers or goods. The use of driveways may be especially helpful in both suburban and dense urban environments where parking may not always be readily available near a pickup or drop off location. Moreover, the use of driveways may reduce the likelihood of inconvenience to other road users as the autonomous vehicle does not need to take up another parking spot or potentially block traffic if double-parked. In many cases, this may reduce the distance the passenger (or other user of the transportation service) needs to travel to reach the vehicle or destination (e.g. a house or building) and also may provide the passenger (or other user of the transportation service) with more time to load or unload objects from the vehicle. In addition, allowing pullovers in driveways may improve the passenger's pickup or drop off experience by making it feel more personalized, but the same may be true for deliveries of goods.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of enabling autonomous vehicles to pull over when picking up a passenger, the method comprising:
receiving, by one or more processors of an autonomous vehicle, dispatch instructions, the dispatch instructions identifying a polygon for a driveway for a starting location for a trip;
controlling, by the one or more processors, the autonomous vehicle based on the polygon;
receiving, by the one or more processors, a location of a client computing device associated with the trip;
determining, by the one or more processors, whether to pull over into the driveway based on the received location of the client computing device; and
based on the determination, controlling, by the one or more processors, the autonomous vehicle to pull over the autonomous vehicle.

2. The method of claim 1, wherein the determining whether to pull over into the driveway is further based on a comparison of the received location of the client computing device to the starting location.

3. The method of claim 2, wherein the determining whether to pull over into the driveway is further based on a distance between the received location of the client computing device and the starting location.

4. The method of claim 3, wherein the determining whether to pull over into the driveway is further based on a comparison of the distance to a predetermined threshold distance.

5. The method of claim 1, wherein controlling the autonomous vehicle based on the polygon includes using a location of the polygon to set a destination for the autonomous vehicle.

6. The method of claim 1, wherein the location the client computing device is received once the autonomous vehicle is a predetermined distance in time or space from the location of the polygon.

7. The method of claim 1, further comprising:
receiving authentication information; and
authenticating the client computing device, and wherein the determining whether to pull over into driveway is further based on the authentication of the client computing device.

8. The method of claim 1, further comprising, receiving updated dispatch instructions confirming that the autonomous vehicle can pull over in the driveway, and wherein the determining whether to pull over into driveway is further based on the updated dispatch instructions.

9. The method of claim 8, wherein the updated dispatch instructions indicate that the passenger has confirmed that the autonomous vehicle can pull over in the driveway.

10. The method of claim 1, wherein the dispatch instructions enable the one or more processors to identify the polygon by location of vertices of the polygon.

11. A system of enabling autonomous vehicles to pull over when picking up a passenger, the system comprising one or more processors configured to:
receive dispatch instructions, the dispatch instructions identifying a polygon for a driveway for a starting location for a trip;
control the autonomous vehicle based on the polygon;
receiving a location of a client computing device associated with the trip;
determine whether to pull over into the driveway based on the received location of the client computing device; and
based on the determination, control the autonomous vehicle to pull over the autonomous vehicle.

12. The system of claim 11, wherein the one or more processors are further configured to determine whether to pull over into the driveway further based on a comparison of the received location of the client computing device to the starting location.

13. The system of claim 12, wherein the one or more processors are further configured to determine whether to pull over into the driveway further based on a distance between the received location of the client computing device and the starting location.

14. The system of claim 13, wherein the one or more processors are further configured to determine whether to pull over into the driveway further based on a comparison of the distance to a predetermined threshold distance.

15. The system of claim 11, wherein the one or more processors are further configured to control the autonomous vehicle based on the polygon by using a location of the polygon to set a destination for the autonomous vehicle.

16. The system of claim 11, wherein the one or more processors are further configured to receive the location the client computing device once the autonomous vehicle is a predetermined distance in time or space from the location of the polygon.

17. The system of claim 11, wherein the one or more processors are further configured to:

receive authentication information; and authenticate the client computing device, and to determine whether to pull over into driveway further based on the authentication of the client computing device.

18. The system of claim 11, wherein the one or more processors are further configured to receive updated dispatch instructions confirming that the autonomous vehicle can pull over in the driveway, and to determine whether to pull over into driveway further based on the updated dispatch instructions.

19. The system of claim 18, wherein the updated dispatch instructions indicate that a passenger for the trip has confirmed that the autonomous vehicle can pull over in the driveway.

20. The system of claim 11, wherein the dispatch instructions enable the one or more processors to identify the polygon by location of vertices of the polygon.

* * * * *